(12) United States Patent
Celis et al.

(10) Patent No.: US 12,507,704 B2
(45) Date of Patent: Dec. 30, 2025

(54) PROCESS RECIPE CHEESE PRODUCT WITH IMPROVED MELT AND FIRMNESS AND METHOD FOR MANUFACTURE

(71) Applicant: Kraft Foods Group Brands LLC, Chicago, IL (US)

(72) Inventors: Marlene Celis, Chicago, IL (US); Shantanu Agarwal, Schaumburg, IL (US); Kathryn Jeanne Horan, Deerfield, IL (US); Jonathan L. Reeve, Glenview, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 948 days.

(21) Appl. No.: 16/065,886

(22) PCT Filed: Dec. 30, 2016

(86) PCT No.: PCT/US2016/069373
§ 371 (c)(1),
(2) Date: Jun. 25, 2018

(87) PCT Pub. No.: WO2017/117481
PCT Pub. Date: Jul. 6, 2017

(65) Prior Publication Data
US 2019/0008178 A1 Jan. 10, 2019

Related U.S. Application Data

(60) Provisional application No. 62/312,843, filed on Mar. 24, 2016, provisional application No. 62/273,338, filed on Dec. 30, 2015.

(51) Int. Cl.
*A23C 20/02* (2025.01)
*A23C 19/082* (2006.01)
*A23L 29/219* (2016.01)

(52) U.S. Cl.
CPC ............ *A23C 20/02* (2013.01); *A23C 19/082* (2013.01); *A23L 29/219* (2016.08); *A23V 2002/00* (2013.01)

(58) Field of Classification Search
CPC ....................................... A23C 19/08
See application file for complete search history.

(56) References Cited

U.S. PATENT DOCUMENTS

2005/0249853 A1* 11/2005 Merrill ............... A23C 19/0684
426/582
2009/0061065 A1 3/2009 Reyes
(Continued)

FOREIGN PATENT DOCUMENTS

EP 0 383 375 A2 8/1990
GB 2 324 236 A 10/1998
(Continued)

OTHER PUBLICATIONS

English Translation, RU-2429705-C2, pp. 1-3. (Year: 2011).*
(Continued)

*Primary Examiner* — Elizabeth Gwartney
(74) *Attorney, Agent, or Firm* — Fitch, Even, Tabin & Flannery LLP

(57) ABSTRACT

In one form, a process recipe cheese product composition is provided with improved melt and improved firmness as well as a method of manufacturing the same. The process recipe cheese product composition includes vegetable oil, corn-derived starches, and potato-derived starches. The process recipe cheese product may have a mechanical firmness in a range of about 6.5 to about 12 Kg·s and provide a melt in a range of 1" to 1½" as measured by heating a disc of cheese 0.875" in diameter and 0.25" thick in a double boiler containing water and heated over medium heat for 4 minutes.

18 Claims, 14 Drawing Sheets

(56) References Cited

U.S. PATENT DOCUMENTS

2013/0122177 A1  5/2013  Fannon et al.
2013/0164430 A1  6/2013  Klemaszewski

FOREIGN PATENT DOCUMENTS

RU        2429705 C2 *  9/2011
WO        00/08951 A1    2/2000
WO     2007/125525 A2   11/2007

OTHER PUBLICATIONS

St-Gelais et al., Production of fresh Cheddar cheese curds with controlled post acidification and enhanced flavor, J. Dairy Sci., 92, 2008, pp. 1856-1863. (Year: 2008).*
Patent Cooperation Treaty, International Search Report and Written Opinion of the International Searching Authority dated Mar. 15, 2017 for International Application No. PCT/US2016/069373, 17 pages.

* cited by examiner

FIG. 9A
FIG. 9B
FIG. 9C

PROCESS RECIPE CHEESE PRODUCT WITH IMPROVED MELT AND FIRMNESS AND METHOD FOR MANUFACTURE

CROSS-REFERENCE TO RELATED APPLICATIONS

This application is a U.S. national phase application filed under 35 U.S.C. § 371 of International Application Number PCT/US2016/069373, filed Dec. 30, 2016, designating the United States, which claims benefit of U.S. Provisional Application No. 62/312,843, filed Mar. 24, 2016, and U.S. Provisional Application No. 62/273,338, filed Dec. 30, 2015.

FIELD

The present application is directed to process recipe cheese products and methods of manufacture and, more particularly, to process recipe cheese products with improved melt and firmness through usage of starches and non-dairy fats.

BACKGROUND

Process recipe cheese products have been developed to provide a healthy alternative to in standard process cheeses. Such process recipe cheese products may include a number of benefits, such as providing lower saturated fat, varying ingredient diversity, and the like. However, doing so may negatively impact consumer acceptance of these products as the process recipe cheese product may not perform similar to process cheese, i.e., have sufficient firmness to maintain desired shapes, ability to cut without excessive stickiness, and ability to melt in various hot applications.

While process recipe cheese products can make use of a variety of different ingredients and compositions, it is still oftentimes desirable for these cheeses to have certain organoleptic properties, nutritional properties, and functional properties. By attempting to improve one of these properties, for example nutritional properties, other properties, such as organoleptic properties and functional properties, may be adversely impacted such as melt and firmness of the process recipe cheese product. In this regard, the cheese may have poor block structure, excessive stickiness, or poor melt and the like.

Typically, vegetable oils can be used to replace animal fat (especially dairy fats) that are high in saturated fats and are known to cause cardio vascular disease. However, vegetable oils or combinations of vegetable oils used in process recipe cheese products have lower melting points compared to dairy fats, leading to poor block structure and excessive stickiness in the cheese loaf/chunk. Previous attempts to reduce saturated fats and make the cheese firm by either formulation (using starches, and hydrocolloids or combination thereof) or processing (temperature and shear or combinations thereof) impact meltability of process recipe cheese in hot applications (>170° F.). In other words, this may impact the hot viscosity and adversely affect the processability of the cheese.

SUMMARY

In one form, a process recipe cheese product composition is provided with improved melt and improved firmness. The process recipe cheese product composition includes vegetable oil, corn-derived starches, and potato-derived starches, amongst other components. The process recipe cheese product composition may include about 1 to about 10 wt. % vegetable oil, about 0.5 to about 10 wt. % corn-derived starches, and about 0 to about 10 wt. % potato-derived starches. In one form, the composition includes about 0.5 to about 5 wt. % corn-derived starches, and about 0 to about 5 wt. % potato-derived starches. According to one form, the composition includes about 0.5 to about 3 wt. % corn-derived starches, and about 0 to about 3 wt. % potato-derived starches.

According to one form, the process recipe cheese product composition has a mechanical firmness in a range of about 6.5 to about 12 Kg·s and provides a melt in a range of 1" to 1½" as measured by heating a disc of cheese 0.875" in diameter and 0.25" thick in a double boiler containing water and heated over medium heat for 4 minutes.

In accordance with one form, the corn or potato-derived starches are cross-linked and/or modified by n-octenyl succinic anhydride (nOSA).

In one form, the process recipe cheese product contains oil droplets therein where at least 40% of the oil droplets are smaller than 10 micrometers.

According to one form, a method is provided for preparing process recipe cheese product. The method includes the steps of combining about 1 to about 10 wt. % vegetable oil, about 0 to about 10 wt. % potato-derived starches and/or about 0.5 to about 10 wt. % corn-derived starches to form a mixture, cooking the mixture at a temperature of about 170 to about 210° F. to form a cooked mixture, and shearing at least one of the mixture and/or the cooked mixture.

In accordance with one form, at least one of the shearing and cooking steps are performed to provide oil droplets in the process recipe cheese product wherein at least 40% of the oil droplets are smaller than 10 micrometers.

These and other aspects may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 8A is a picture of the composition of the Control Sample;

FIG. 8B is a picture of the composition of Sample 2;

FIG. 9A is a picture of the composition of Sample 5;

FIG. 9B is a picture of the composition of Sample 7;

FIG. 9C is a picture of the composition of Sample 9;

DETAILED DESCRIPTION

Figure 1:
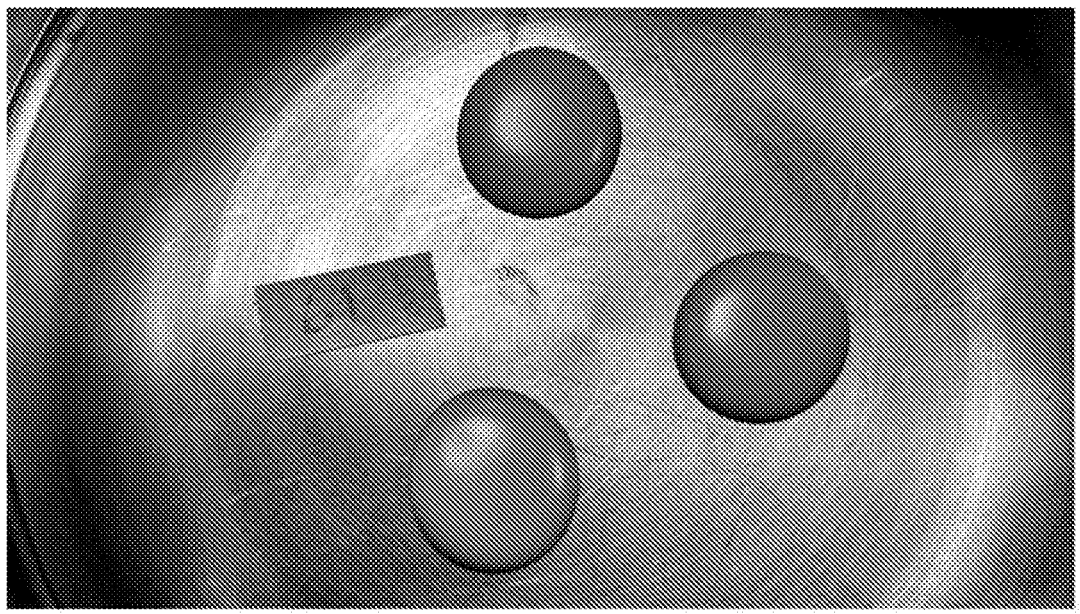
FIG. 1 is a photo depicting process recipe cheese according to Example 1 having desirable disk melts after heating for four minutes in a double boiler.

The present application relates to process recipe cheese product compositions as well as methods of manufacture. The terms process recipe cheese product and process recipe cheese product composition refer to a cheese composition that is shelf stable and is a low acid cheese that meets FDA's LACF requirements. In one form, the composition may comprise a dairy protein source (e.g., natural cheese, milk protein, whey protein and mixtures thereof); a fat source (e.g., a vegetable oil such as canola oil); an emulsifying salt composition; modified food starch (potato and/or corn based), or mixture thereof; and emulsifying phosphate salts.

According to one form, the process recipe cheese product may have a moisture content of about 45 to about 54 percent and a protein content of about 8 to about 16 percent. In one form, the emulsifying salt composition comprises phosphate salts (e.g., monosodium phosphate, mono potassium phosphate, disodium phosphate, dipotassium phosphate or mixtures thereof). In one form, the process recipe cheese product has both good melting properties and a texture suitable for cubing, slicing etc.

It should be appreciated that process recipe cheese products and process recipe cheese product compositions may refer to a composition used to make the cheese product or the final product. This may include one or more intermediate compositions prepared during the process of forming a final cheese product. Further, other forms of cheese and cheese related products may incorporate one or more of the features described herein. For example, such products may include substitute cheese, analog cheese, and other cheese and cheese related compositions.

In one form, the process recipe cheese product may include vegetable oils, corn-derived starches, and potato-derived starches. In certain forms, the process recipe cheese product may be configured into a loaf or chunk and may have a mechanical firmness in a range of 6.5 to 12 Kg·s and disc melts in a range of 1" to 1½" as measured by heating a disc of cheese 0.875" in diameter and 0.25" thick in a double boiler containing water and heated over medium heat for 4 minutes.

More specifically, in one form, the process recipe cheese product includes about 1 to about 10 wt. % vegetable oil, about 0 to about 10 wt. % potato-derived starches (optionally 0.5 to 5 wt. % and 1 to 3 wt. %) and/or about 0.5 to about 10 wt. % corn-derived starches (optionally 0.5 to 5 wt. % and 0.5 to 3 wt. %). The amounts listed herein are by weight unless otherwise identified. The composition may also include 0.1-1% hydrocolloids, as well as other components.

The composition can include a variety of different oils and fats to provide the desired organoleptic and functional properties. For example, vegetable oils can be used. In one form, about 2% to about 12% liquid, non-interesterified/non-hydrogenated vegetable oils can be used in the composition. These oils can include vegetable oils that are liquid at room temperature. In one form, these vegetable oils can include refined, bleached, deodorized vegetable oils. The liquid, non-interesterified/non-hydrogenated vegetable oils can include different materials including, but not limited to, canola oil, soybean, flax, sunflower, grapeseeds, and/or fruit such as avocado, olive, etc., and nuts such as almond, peanut oil, hazelnut, palm, palm kernel, coconut, shea butter, and the like, and mixtures thereof. In one form, canola oil is used. In another form, canola oil is used in an amount of about 5% to about 10%.

The composition can also include various amounts of specific corn-derived starches. For example, in one form, the composition may include about 0.25% to about 10.0% corn-derived starches.

In one form, the invention uses a unique combination of three different modified food starches. Their usage ratios have been optimized to work synergistically and enable the use of higher amounts of vegetable oil(s) while increasing firmness, minimizing stickiness and improving melt of the finished processed cheese product. In one form, three different modified food starches can be used which include two starches derived from corn: one is a hydroxylated distarch phosphate (E1442) which provides high processing tolerance, process viscosity and stability and the other is a n-OSA substituted starch (E1450) which has lipophilic properties to enable emulsification of the vegetable oil. The use of a n-OSA substituted starch together with high processing shear enables the formation of smaller oil droplets that help to stabilize the emulsion in the cheese matrix while also contributing to an increase in product firmness. The third starch used is an oxidized potato starch (E1404) which enables a higher degree of melt in the finished product. This improved melt is due to the oxidation of the starch as well as the larger granule size of potato starch. Oxidation reduces the molecular weight of the starch and destroys its crystal structure thereby reducing the tendency of amylose to retrograde.

In one form, the corn-derived starches have a particle size of about 25 to about 40 microns. According to one form, the corn-derived starches have a particle size of about 30 microns in diameter.

The composition can also include varying amounts of potato-derived food starches. For example, the composition can include about 0.5% to about 10% potato-derived food starches. In one form, the composition can include about 1% to about 3% potato-derived food starches.

Granular waxy corn starches are typically excellent water managers and viscosifying agents, whereas the acid-thinned starches are good gelling agents in a finished product. In this form, modified waxy maize provides excellent in-process, hot viscosity which enables filling cartons without splashing. Acid-thinned potato starches provide low hot viscosity and gel in the finished product once cooled, yielding structure but not inhibiting melt.

In one form, the corn-derived starch, such as a dual modified waxy corn starch can be provided in a ratio to the potato-derived of about 1:1 to about 6:1. According to one form, such a ratio may provide a desirable texture in terms of hot viscosity and final cheese texture without inhibiting the melt of the cheese.

In one form, the fat to starch ratio is about 1:3 to about 1:8. According to one form, the fat to starch ratio is about 1:5. In another form, the ratio is about 1:7.

Various protein sources may be included, such as, but not limited to cheese, concentrate skim or whole milk, milk protein concentrate, ultra-filtered milk, whey protein concentrate, butter milk, sweet whey, and the like. Further, milk fat source may also be included such as anhydrous milk fat, cream, and the like.

Hydrocolloids can be chosen to provide mouth feel and/or firmness quickly when cooled to refrigeration temperatures and are thermoreversible, contributing to desirable melt properties at typical hot application temperatures (>170° F.).

The composition can include various other components in the cheese composition. For example, the composition can include gums, acids, salts, flavors, and other components.

The process recipe cheese product composition may take a variety of forms. For example, the imitation cheese can take the forms of slices, blocks, shredded, and the like.

Further, the cheese can come in different varieties including, but not limited to American, cheddar, mozzarella, provolone, Swiss, and the like.

In one form, the various ingredients (cheese, dairy powders, starches, salt, color, and flavors) are mixed together and then cooked, such as at a temperature of about 170-210° F. Preferably, various components or combination of components are mixed together and may be subjected to shear before, during, and/or after cooking to achieve desired oil droplet size in process recipe cheese product.

Shear can be provided through a variety of different operations such as high shear mixers, homogenizers, cavitators, shearing pumps, and combinations thereof to one or more streams before, during, or after cooking to achieve oil droplet size of 40 to 100% below the desired size of 10 micron.

In one form, the shear and/or cooking processes can be used to achieve a desired oil droplet size in the process recipe cheese product. In one form, the oil droplet size is such that at least about 40% of the droplets are smaller than about 10 microns. By having such oil droplets, the process recipe cheese product may have desirable hot viscosity, such as during processing, improved melt, improved firmness, and reduced stickiness.

Melt can be measured by heating a disc of cheese 0.875" in diameter and 0.25" thick in a double boiler containing water and heated over medium heat for 4 minutes. Rheological Thermal Analysis Test can be used to measure the linear viscoelastic properties (minimum energy needed to melt) of the process recipe cheese product as a function of temperature.

Figure 11:
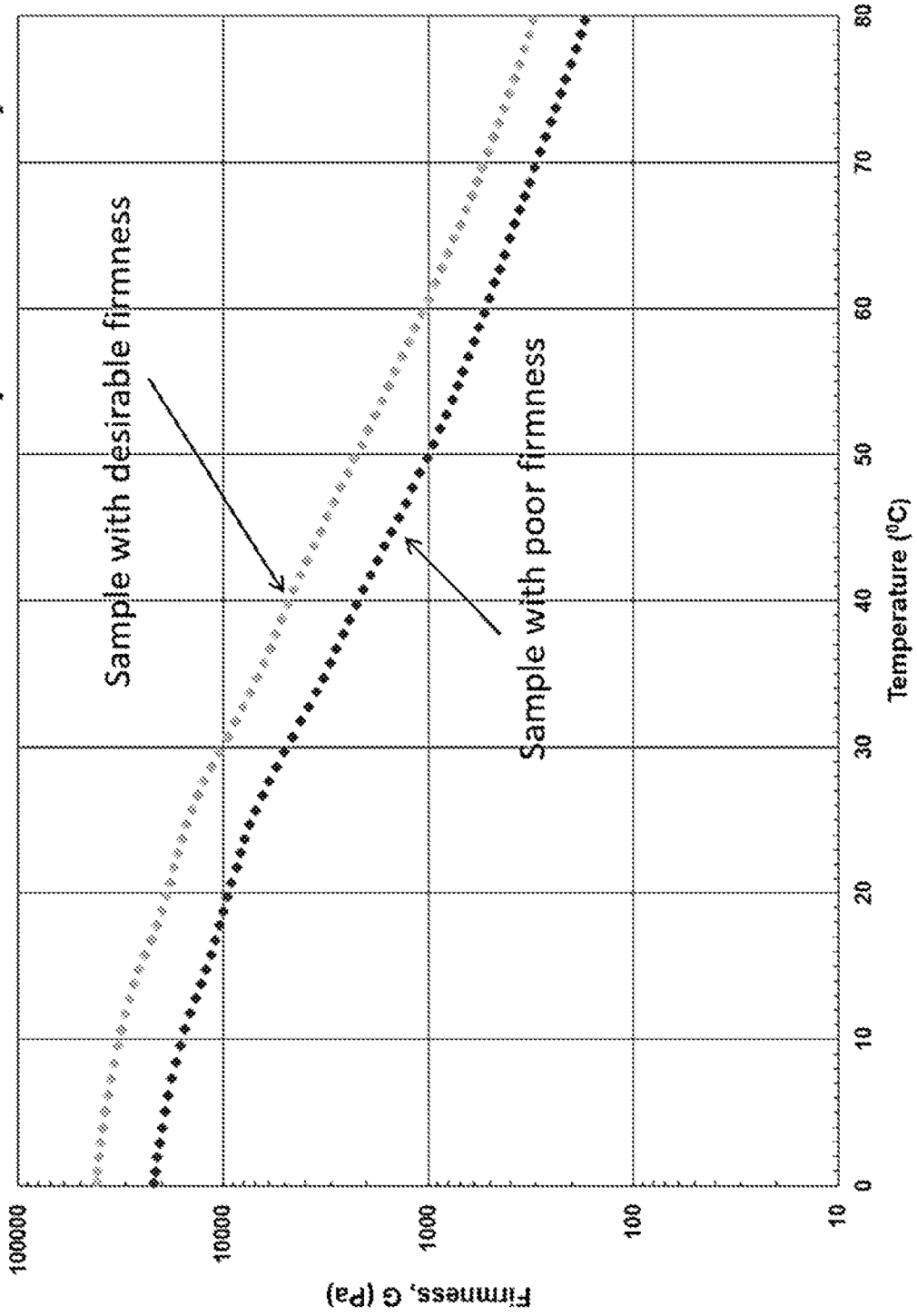
FIG. 11 is a plot of firmness versus temperature for sample compositions.

Rheological Thermal Analysis Test to measure the linear viscoelastic properties of the process recipe cheese product as a function of temperature is shown in FIG. 11.

In one form, the process recipe cheese product is a shelf stable low acid product and may be configured to meet the FDA's Low Acid Canned Foods (LACF) regulations for moisture, pH, salt, etc.

EXAMPLES

Example 1: Firmness and Melt Similar to Traditional Process Cheese Loaf/Chunk

TABLE 1

Composition of Example 1.
Formula

| | |
|---|---|
| Skim Milk Concentrate | 32.000% |
| Process Water | 22.7590% |
| Milk Protein Concentrate | 12.767% |
| Cheese | 10.000% |
| Canola Oil | 5.000% |
| Modified Food Starch Texture System (This can include at least one of a ratio of E1442, E1404 and E1450 that ranges from 0.15-0.6:0.15-0.4:0.25-0.6, a ratio of E1442 and E1450 that ranges from 0.15-0.6:0.25-0.6; and/or a ratio of E1442 and E1404 that ranges from 0.15-0.6:0.25-0.6) | 3.000% |
| Emulsifying Salts | 2.531% |
| Whey Protein Concentrate-34 | 2.144% |
| Non Fat Dry Milk | 2.000% |
| Dry Whey | 1.470% |
| Anhydrous Milk Fat | 1.423% |
| Sodium Chloride | 1.085% |
| Tri Calcium Phosphate | 1.000% |
| Maltodextrin | 0.750% |
| Lactic 88% | 0.750% |
| Enzyme Modified Cheese | 0.600% |
| Sorbic Acid | 0.200% |
| Sodium Alginate | 0.145% |
| Sodium Citrate | 0.114% |
| Monosodium Phosphate | 0.225% |
| Annatto | 0.029% |
| Apocarotenal | 0.029% |

Process

Blend dry and liquid ingredients (cheese, dairy powders, vegetable oil, enzyme modified cheeses, starches and gums, tricalcium phosphate, sodium chloride, color, sorbic acid, and a portion of the water) and mix with appropriate high shear mixers to achieve homogeneous mass.

Add cheese blend, water, lactic acid and emulsifiers to steam injection cooker. Cook blend at appropriate shear rate to achieve oil droplet size of 40 to 100% below desired particle size of 10 micron to a temperature of 175-210° F. and hold for a minimum of 1 minute.

Appropriate shear may be applied using high shear mixers and/or homogenizers either throughout cooking to achieve desired product attributes (melts and firmness).

Product is packaged into loaf/chunk format and cooled to temperatures below 130° F., preferably below 100° F. within 1 to 6 hours after cooking.

The composition of Example 1 was tested for melt properties. The composition resulted in disc melts in range of 1" to 1½" as measured by heating a disc of cheese 0.875" in diameter and 0.25" thick in a double boiler containing water and heated over medium heat for 4 minutes. As shown in FIG. 1, the composition of Example 1 had suitable melt.

Figure 3:
FIG. 3 is a photo depicting process recipe cheese according to Example 1 formed into a block having a firm texture that cuts clean with no stickiness.
Figure 4:
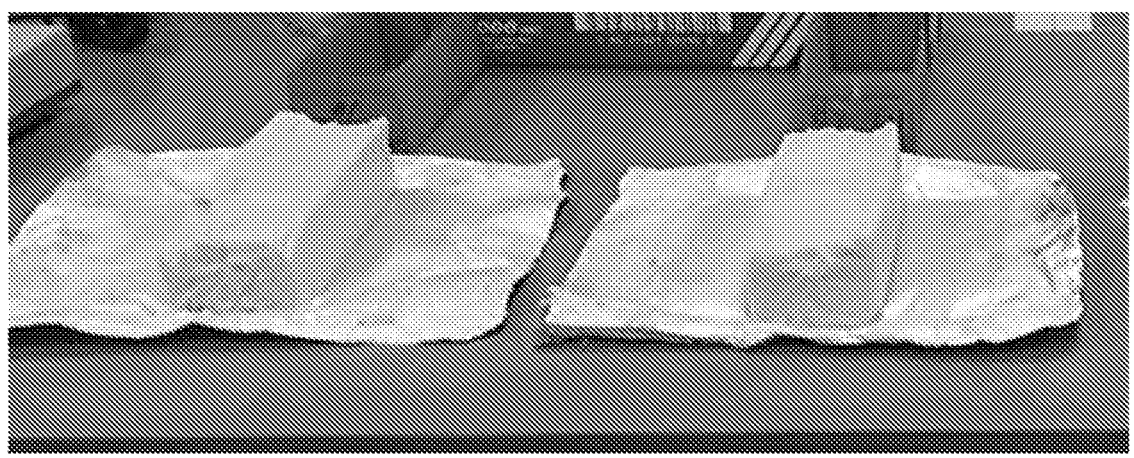
FIG. 4 is a photo depicting process recipe cheese according to Example 5 formed into a block having a soft texture and high stickiness.
Figure 5B:
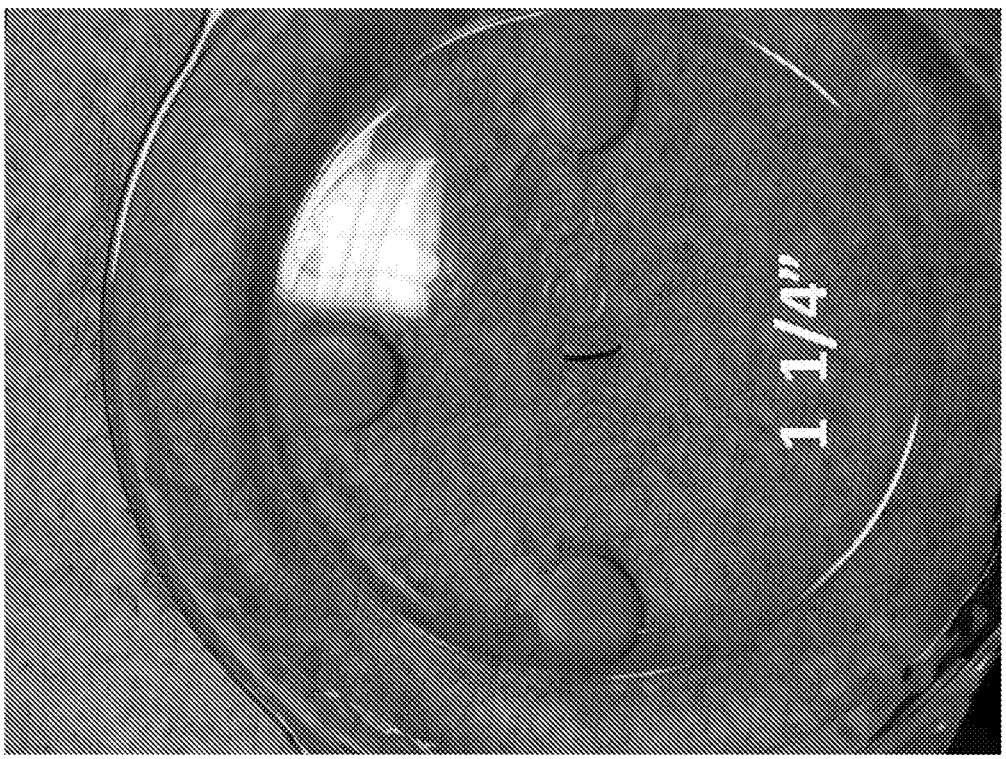
FIG. 5B is a picture of the composition of Sample 1 during a melt test.
Figure 5A:
FIG. 5A is a picture of the composition of Sample 1 in block form.
Figure 6A:
FIG. 6A is a picture of the composition of Sample 4 in block form.
Figure 6B:
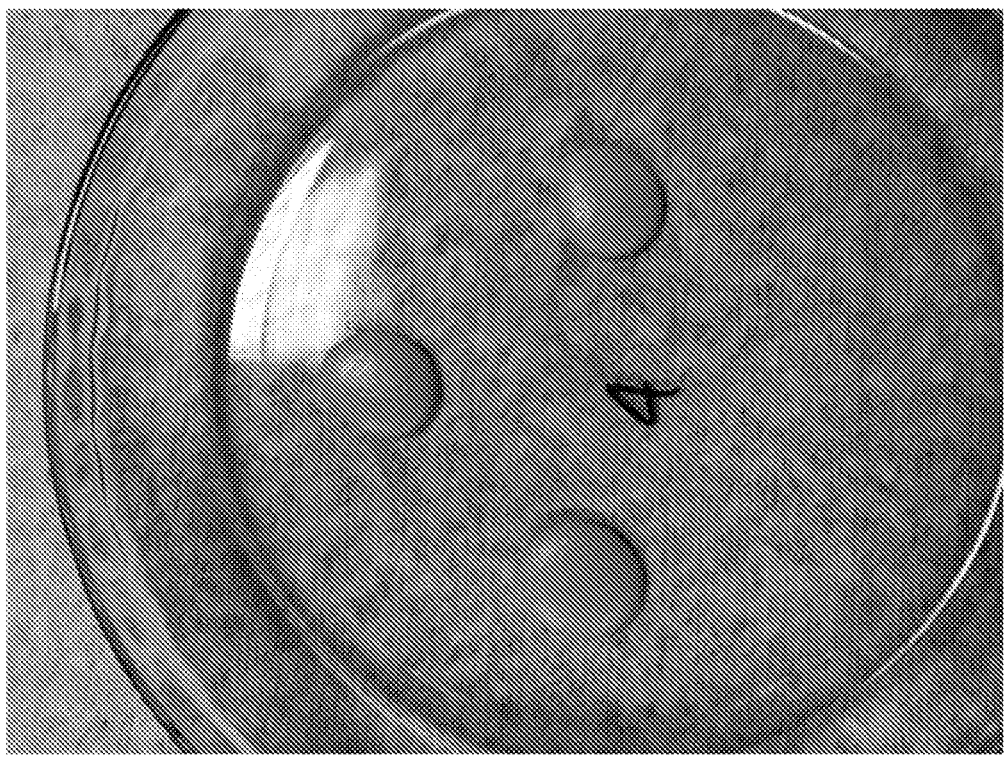
FIG. 6B is a picture of the composition of Sample 4 during a melt test.
Figure 7B:
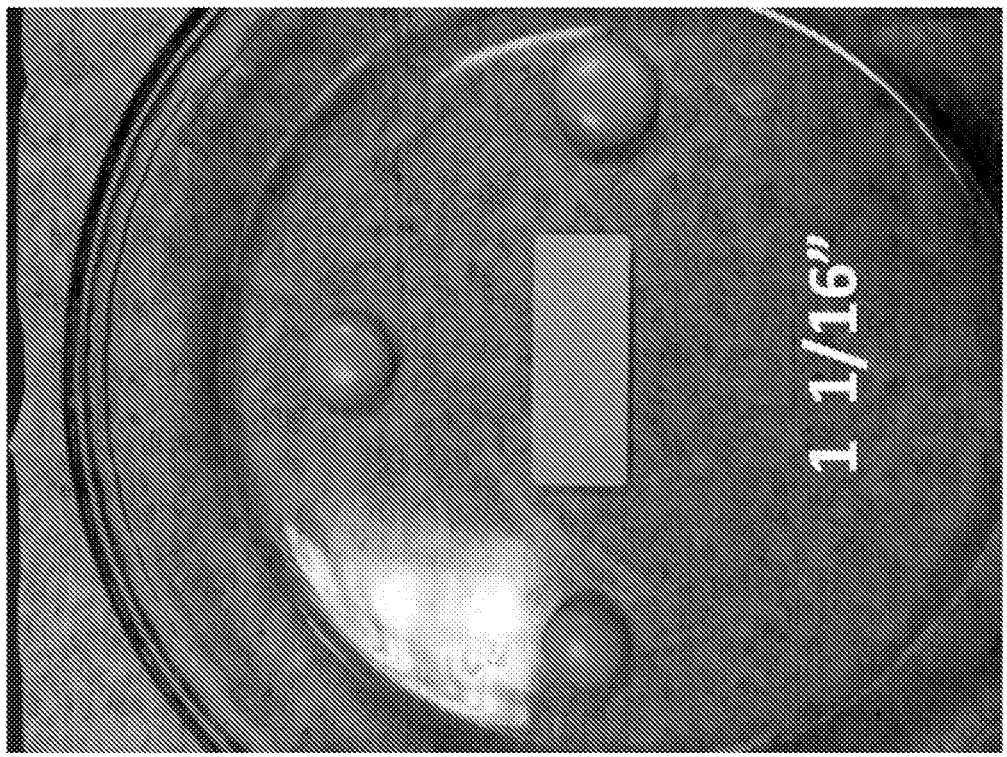
FIG. 7B is a picture of the composition of Sample 8 during a melt test.
Figure 7A:
FIG. 7A is a picture of the composition of Sample 8 in block form.
Figure 8C:
FIG. 8C is a picture of the composition of Sample 3.
Figure 8C:
Figure 8C:

Further, the composition of Example 1 was formed into a cheese product block, as shown in FIG. 3. The cheese product block had a firm texture and cut clean with no stickiness.

Example 2: Firmness and Melt Similar to Traditional Process Cheese Loaf/Chunk

TABLE 2

Composition of Example 2. Formula

| | |
|---|---|
| Skim Milk Concentrate | 32.000% |
| Process Water | 22.05% |
| Cheese | 10.000% |
| Canola Oil | 9.700% |
| Milk Protein Concentrate-70 | 7.76% |
| Dry Whey | 5.67% |
| Modified Food Starch Texture System (This can include at least one of a ratio of E1442, E1404 and E1450 that ranges from 0.15-0.6:0.15-0.4:0.25-0.6, a ratio of E1442 and E1450 that ranges from 0.15-0.6:0.25-0.6; and/or a ratio of E1442 and E1404 that ranges from 0.15-0.6:0.25-0.6) | 3.000% |
| Emulsifying Salts | 2.531% |
| Whey Protein Concentrate-34 | 2.144% |
| Non Fat Dry Milk | 2.000% |
| Sodium Chloride | 1.09% |
| Tri Calcium Phosphate | 1.000% |
| Maltodextrin | 0.750% |
| Lactic 88% | 0.750% |
| Enzyme Modified Cheese | 0.600% |
| Whey Protein Concentrate-34 | 0.31% |
| Sorbic Acid | 0.200% |
| Sodium Alginate | 0.175% |
| Sodium Citrate | 0.114% |
| Monosodium Phosphate | 0.225% |
| Annatto | 0.029% |
| Apocarotenal | 0.029% |

Process

Blend dry and liquid ingredients (cheese, dairy powders, vegetable oil, enzyme modified cheeses, starches and gums, tricalcium phosphate, sodium chloride, color, sorbic acid, and a portion of the water) and mix with appropriate high shear mixers.

Add cheese blend, water, lactic acid and emulsifiers to steam injection cooker. Cook blend at appropriate shear rate to achieve oil droplet size of 40 to 100% below desired particle size of 10 micron to a temperature of 175-210° F. and hold for a minimum of 1 minute.

Appropriate shear may be applied to achieve oil droplet size of 40 to 100% below desired particle size of 10 micron using high shear mixers and/or homogenizers either after cooking to achieve desired product attributes (melts and firmness).

Product is packaged into loaf/chunk format and cooled to temperatures below 130° F., preferably below 100° F. within 1 to 6 hours after cooking.

Example 3: Firmness and Melt Similar to Traditional Process Cheese Loaf/Chunk

TABLE 3

Composition of Example 3. Formula

| | |
|---|---|
| Skim Milk Concentrate | 32.000% |
| Process Water | 22.7590% |
| Milk Protein Concentrate | 12.767% |
| Cheese | 10.000% |
| Canola Oil | 5.000% |
| Modified Food Starch Texture System (This can include at least one of a ratio of E1442, E1404 and E1450 that ranges from 0.15-0.6:0.15-0.4:0.25-0.6, a ratio of E1442 and E1450 that ranges from 0.15-0.6:0.25-0.6; and/or a ratio of E1442 and E1404 that ranges from 0.15-0.6:0.25-0.6) | 3.000% |
| Emulsifying Salts | 2.531% |
| Whey Protein Concentrate-34 | 2.144% |
| Non Fat Dry Milk | 2.000% |
| Dry Whey | 1.470% |
| Anhydrous Milk Fat | 1.423% |
| Sodium Chloride | 1.085% |
| Tri Calcium Phosphate | 1.000% |
| Maltodextrin | 0.750% |
| Lactic 88% | 0.750% |
| Enzyme Modified Cheese | 0.600% |
| Sorbic Acid | 0.200% |
| Sodium Alginate | 0.145% |
| Sodium Citrate | 0.114% |
| Monosodium Phosphate | 0.225% |
| Annatto | 0.029% |
| Apocarotenal | 0.029% |

Process

Make wet mix emulsion of some water, some dairy powders, some starches and vegetable oil using a high shear device such as a combination of high shear mixers and/or homogenizers.

Make cheese blend by blending dry and some liquid ingredients (cheese, wet mix emulsion, enzyme modified cheeses, starches and gums, tricalcium phosphate, sodium chloride, color, sorbic acid, and a portion of the water) and mix with appropriate high shear mixers to achieve oil droplet size of 40 to 100% below desired particle size of 10 micron.

Add cheese blend, water, lactic acid and emulsifiers to steam injection cooker. Cook blend to 175-210° F. and hold for a minimum of 1 minute. Appropriate shear may be applied using high shear mixers and/or homogenizers.

Product is packaged into loaf/chunk format and cooled to temperatures below 130° F., preferably below 100° F. within 1 to 6 hours.

Example 4: Firmness and Melt Similar to Traditional Process Cheese Loaf/Chunk (Palm Oil or Solid Fat/Oil)

TABLE 4

Composition of Example 4. Formula

| | |
|---|---|
| Skim Milk Concentrate | 32.000% |
| Process Water | 22.7590% |
| Milk Protein Concentrate | 12.767% |
| Cheese | 10.000% |
| Canola Oil | 5.000% |
| Modified Food Starch Texture System (This can include at least one of a ratio of E1442, E1404 and E1450 that ranges from 0.15-0.6:0.15-0.4:0.25-0.6, a ratio of E1442 and E1450 that ranges from 0.15-0.6:0.25-0.6; and/or a ratio of E1442 and E1404 that ranges from 0.15-0.6:0.25-0.6) | 3.000% |
| Emulsifying Salts | 2.531% |
| Whey Protein Concentrate-34 | 2.144% |
| Palm Oil | 2.000% |

TABLE 4-continued

Composition of Example 4.
Formula

| | |
|---|---|
| Non Fat Dry Milk | 2.000% |
| Dry Whey | 1.470% |
| Anhydrous Milk Fat | 1.423% |
| Sodium Chloride | 1.085% |
| Tri Calcium Phosphate | 1.000% |
| Maltodextrin | 0.750% |
| Lactic 88% | 0.750% |
| Enzyme Modified Cheese | 0.600% |
| Sorbic Acid | 0.200% |
| Sodium Alginate | 0.145% |
| Sodium Citrate | 0.114% |
| Monosodium Phosphate | 0.225% |
| Annatto | 0.029% |
| Apocarotenal | 0.029% |

Process

Blend dry and liquid ingredients (cheese, dairy powders, vegetable oil, enzyme modified cheeses, starches and gums, tricalcium phosphate, sodium chloride, color, sorbic acid, and a portion of the water) and mix with appropriate high shear mixers to achieve oil droplet size of 40 to 100% below desired particle size of 10 micron.

Add cheese blend, water, lactic acid and emulsifiers to steam injection cooker. Cook blend at appropriate shear rate to a temperature of 175-210° F. and hold for a minimum of 1 minute.

Appropriate shear may be applied using high shear mixers and/or homogenizers either after cooking to achieve desired product attributes (melts and firmness).

Product is packaged into loaf/chunk format and cooled to temperatures below 130° F., preferably below 100° F. within 1 to 6 hours after cooking.

Example 5: Poor Firmness Compared to Traditional Process Cheese Loaf/Chunk

TABLE 5

Composition of Example 5.
Formula

| | |
|---|---|
| Skim Milk Concentrate | 32.000% |
| Process Water | 22.7590% |
| Milk Protein Concentrate | 12.767% |
| Cheese | 10.000% |
| Canola Oil | 5.000% |
| Modified Food Starch (Rezista) | 1.500% |
| Emulsifying Salts | 2.531% |
| Whey Protein Concentrate-34 | 2.144% |
| Non Fat Dry Milk | 2.000% |
| Dry Whey | 2.970% |
| Anhydrous Milk Fat | 1.423% |
| Sodium Chloride | 1.085% |
| Tri Calcium Phosphate | 1.000% |
| Maltodextrin | 0.750% |
| Lactic 88% | 0.750% |
| Enzyme Modified Cheese | 0.600% |
| Sorbic Acid | 0.200% |
| Sodium Alginate | 0.145% |
| Sodium Citrate | 0.114% |
| Monosodium Phosphate | 0.225% |
| Annatto | 0.029% |
| Apocarotenal | 0.029% |

Process

Blend dry and liquid ingredients (cheese, dairy powders, vegetable oil, enzyme modified cheeses, starches and gums, tricalcium phosphate, sodium chloride, color, sorbic acid, and a portion of the water) and mix.

Add cheese blend, water, lactic acid and emulsifiers to steam injection cooker. Cook blend to 175-185° F. and hold for a minimum of 1 minute.

No or little incremental shear applied either before cooking of wet mix and/or during cooking and/or after cooking of process recipe cheese product.

Product is packaged into loaf/chunk format and cooled to temperatures below 130° F., preferably below 100° F. within 1 to 6 hours.

Example 6: Poor Melts Compared to Traditional Process Cheese Loaf/Chunk

TABLE 6

Composition of Example 6.
Formula

| | |
|---|---|
| Skim Milk Concentrate | 32.000% |
| Process Water | 22.7590% |
| Milk Protein Concentrate | 12.767% |
| Cheese | 10.000% |
| Canola Oil | 5.000% |
| Modified Food Starch, such as E1442 | 1.500% |
| Emulsifying Salts | 2.531% |
| Whey Protein Concentrate-34 | 2.144% |
| Non Fat Dry Milk | 2.000% |
| Dry Whey | 2.970% |
| Anhydrous Milk Fat | 1.423% |
| Sodium Chloride | 1.085% |
| Tri Calcium Phosphate | 1.000% |
| Maltodextrin | 0.750% |
| Lactic 88% | 0.750% |
| Enzyme Modified Cheese | 0.600% |
| Sorbic Acid | 0.200% |
| Sodium Alginate | 0.145% |
| Sodium Citrate | 0.114% |
| Monosodium Phosphate | 0.225% |
| Annatto | 0.029% |
| Apocarotenal | 0.029% |

Process

Blend dry and liquid ingredients (cheese, dairy powders, vegetable oil, enzyme modified cheeses, starches and gums, tricalcium phosphate, sodium chloride, color, sorbic acid, and a portion of the water) and mix.

Add cheese blend, water, lactic acid and emulsifiers to steam injection cooker. Cook blend to 185-210° F. and hold for a minimum of 1 minute.

Excessive incremental shear applied either before cooking of wet mix and/or during cooking and/or after cooking of process recipe cheese product.

Product is packaged into loaf/chunk format and cooled to temperatures below 130° F., preferably below 100° F. within 1 to 6 hours.

Figure 2:
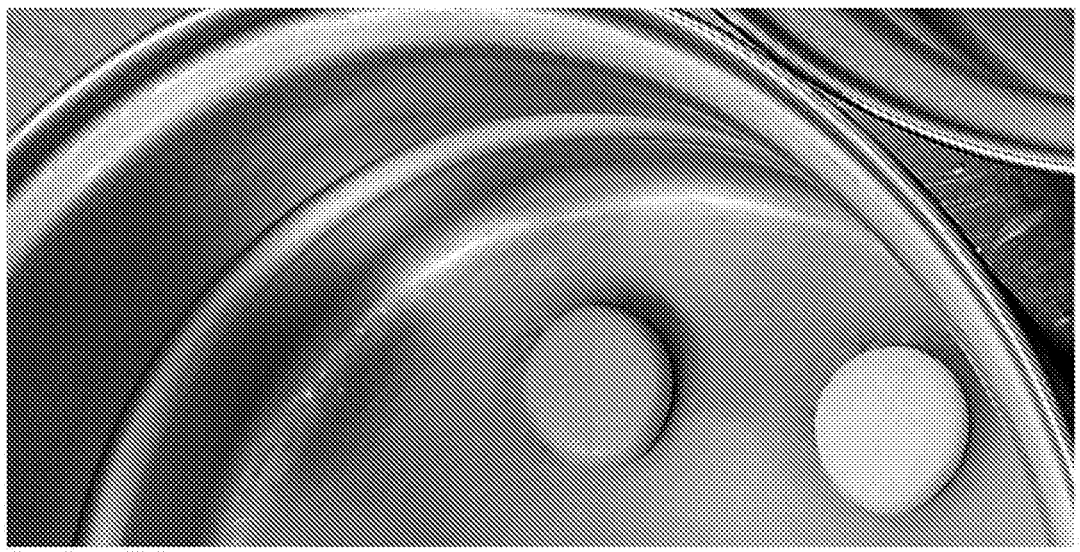
FIG. 2 is a photo depicting process recipe cheese according to Example 6 having undesirable disk melts after heating for four minutes in a double boiler.

The composition of Example 6 was analyzed for melt, similar to Example 1. The composition of Example 6 resulted in poor melt, as shown in FIG. 2.

Example 7: Firmness and Melt Similar to Traditional Process Cheese Loaf/Chunk

TABLE 7

Composition of Example 7.
Formula

| | |
|---|---|
| Skim Milk Concentrate | 32.000% |
| Process Water | 22.7590% |
| Milk Protein Concentrate | 12.767% |

TABLE 7-continued

Composition of Example 7.
Formula

| | |
|---|---|
| Cheese | 10.000% |
| Canola Oil | 5.000% |
| Modified Food Starch such as E1442 | 1.500% |
| Emulsifying Salts | 2.531% |
| Whey Protein Concentrate-34 | 2.144% |
| Non Fat Dry Milk | 2.000% |
| Dry Whey | 2.970% |
| Anhydrous Milk Fat | 1.423% |
| Sodium Chloride | 1.085% |
| Tri Calcium Phosphate | 1.000% |
| Maltodextrin | 0.750% |
| Lactic 88% | 0.750% |
| Enzyme Modified Cheese | 0.600% |
| Sorbic Acid | 0.200% |
| Sodium Alginate | 0.145% |
| Sodium Citrate | 0.114% |
| Monosodium Phosphate | 0.225% |
| Annatto | 0.029% |
| Apocarotenal | 0.029% |

Process

Make wet mix emulsion of water, dairy powders, starches and vegetable oil using a high shear device such as a combination of high shear mixers and/or homogenizers.

Make cheese blend by blending dry and liquid ingredients (cheese, wet mix emulsion, enzyme modified cheeses, starches and gums, tricalcium phosphate, sodium chloride, color, sorbic acid, and a portion of the water) and mix with appropriate high shear mixers to achieve oil droplet size of 40 to 100% below desired particle size of 10 micron.

Add cheese blend, water, lactic acid and emulsifiers to steam injection cooker. Cook blend to 175-210° F. and hold for a minimum of 1 minute. Appropriate shear may be applied using high shear mixers and/or homogenizers.

Product is packaged into loaf/chunk format and cooled to temperatures below 130° F., preferably below 100° F. within 1 to 6 hours.

Table 8 illustrates the change in profile of fatty acids, such as saturated fatty acids, when changing from a standard process cheese formulation to a formulation containing canola oil, such as described and shown in a number of examples herein.

TABLE 8

Fatty acid profile of in standard process cheese compared to process recipe cheese product showing significant reduction in saturated fats.

| | Process cheese | Process recipe cheese product | |
|---|---|---|---|
| | 0% canola oil | 5% canola oil | 10% canola oil |
| 4:0 Butanoic (Butyric) (%) | 0.31 | 0.22 | 0.11 |
| 5:0 Pentanoic (Valeric) (%) | 0.00 | 0.00 | 0.00 |
| 6:0 Hexanoic (Caproic) (%) | 0.25 | 0.17 | 0.08 |
| 7:0 Heptanoic (Enanthic) (%) | 0.00 | 0.00 | 0.00 |
| 8:0 Octanoic (Caprylic) (%) | 0.17 | 0.13 | 0.07 |
| 9:0 Nonanoic (Pelargonic) (%) | 0.00 | 0.00 | 0.00 |
| 10:0 Decanoic (Capric) (%) | 0.39 | 0.28 | 0.14 |
| 11:0 Undecanoic (%) | 0.00 | 0.00 | 0.00 |
| 12:0 Dodecanoic (Lauric) (%) | 0.47 | 0.30 | 0.14 |
| 12:1 Dodecenoic (%) | 0.00 | 0.00 | 0.00 |
| 14:0 Tetradecanoic (Myristic) (%) | 1.38 | 0.94 | 0.47 |
| 14:1 trans-Tetradecenoic (%) | 0.03 | 0.02 | 0.01 |
| 14:1 Tetradecenoic (%) | 0.11 | 0.07 | 0.03 |
| 15:0 Pentadecanoic (%) | 0.15 | 0.10 | 0.05 |
| 15:1 Pentadecenoic (%) | 0.00 | 0.00 | 0.00 |
| 16:0 Hexadecanoic (Palmitic) (%) | 3.83 | 2.83 | 1.79 |
| 16:1 trans-Hexadecenoic (%) | 0.06 | 0.04 | 0.02 |
| 16:1 Hexadecenoic (%) | 0.18 | 0.13 | 0.09 |
| 17:0 Heptadecanoic (Margaric) (%) | 0.09 | 0.06 | 0.04 |
| 17:1 Heptadecenoic (%) | 0.03 | 0.02 | 0.02 |
| 18:0 Octadecanoic (Stearic) (%) | 1.49 | 1.24 | 0.75 |
| 18:1 trans-Octadecenoic (%) | 0.42 | 0.33 | 0.17 |
| 18:1 Octadecenoic (%) | 3.09 | 5.24 | 6.86 |
| 18:2 trans-Octadecadienoic (%) | 0.09 | 0.09 | 0.05 |
| 18:2 Octadecadienoic (%) | 0.39 | 1.27 | 1.96 |
| 18:2 Conj Linoleic (%) | 0.10 | 0.06 | 0.03 |
| 18:3 trans-Octadecatrienoic (%) | 0.00 | 0.00 | 0.00 |
| 18:3 g-Linolenic (%) | 0.01 | 0.04 | 0.06 |
| 18:3 Octadecatrienoic (%) | 0.12 | 0.45 | 0.82 |
| 18:4 Octadecatetraenoic (%) | 0.00 | 0.00 | 0.00 |
| 20:0 Eicosanoic (Arachidic) (%) | 0.02 | 0.05 | 0.06 |
| 20:1 trans-Eicosenoic (%) | 0.00 | 0.00 | 0.00 |
| 20:1 Eicosenoic (%) | 0.04 | 0.12 | 0.19 |
| 20:2 Eicosadienoic (%) | 0.00 | 0.01 | 0.01 |
| 20:3 5,8,11-Eicosatrienoic (%) | 0.00 | 0.00 | 0.00 |
| 20:3 8,11,14-Eicosatrienoic (%) | 0.01 | 0.01 | 0.01 |
| 20:3 11,14,17-Eicosatrienoic (%) | 0.00 | 0.00 | 0.00 |
| 20:4 Eicosatetraenoic (%) | 0.02 | 0.02 | 0.01 |
| 20:5 Eicosapentaenoic (%) | 0.01 | 0.00 | 0.00 |
| 21:0 Heneicosanoic (%) | 0.00 | 0.00 | 0.00 |
| 22:0 Docosanoic (Behenic) (%) | 0.01 | 0.02 | 0.03 |
| 22:1 trans-Docosaenoic (%) | 0.00 | 0.00 | 0.00 |
| 22:1 Docosaenoic (Erucic) (%) | 0.00 | 0.00 | 0.00 |
| 22:2 Docosadienoic (%) | 0.00 | 0.00 | 0.00 |
| 22:3 Docosatrienoic (%) | 0.00 | 0.00 | 0.00 |
| 22:4 Docosatetraenoic (%) | 0.00 | 0.00 | 0.00 |
| 22:5 Docosapentaenoic (%) | 0.01 | 0.01 | 0.00 |
| 22:6 Docosahexaenoic (%) | 0.00 | 0.00 | 0.00 |
| 23:0 Tricosanoic (%) | 0.00 | 0.00 | 0.00 |
| 24:0 Tetracosanoic (%) | 0.01 | 0.01 | 0.02 |
| 24:1 Tetracosaenoic (Nervonic) (%) | 0.00 | 0.01 | 0.02 |
| Total - % TG (%) | 13.99 | 14.99 | 14.80 |
| Total SFA (%) | 8.57 | 6.35 | 3.77 |
| % Reduction in saturated fats | | 25.90 | 56.01 |

Table 9 lists processing conditions and starches that delivered process cheese with either good melts and firmness or poor melts and firmness. Each number indicates a trial conducted under different cook temperature, shear and different starch combination. Each example below is based on Examples 1 to 7 with changes in starch components and processing conditions. Low cook temperature ranged from 170° F. to 185° F. while high cook temperature ranged from 185° F. to 220° F. Low shear conditions ranged from 7000 to 8500 J/lb while high shear energy ranged from 8500 to 10000 J/lb.

TABLE 9

Success and failure from semi works line trials of process cheese made with 5 or 10% canola oil.

| Variable # | Processing condition | | Starch combination | | | | Comment |
|---|---|---|---|---|---|---|---|
| | Cook Temp | Shear Level | E1442 | E1450 | E1404 | E1401 | |
| 121 | Low | High | X | | | X | Poor Firmness |
| 122 | Low | High | X | | | X | Poor Firmness |
| 128 | Low | High | X | | X | | Poor Firmness |
| 145 | Low | High | X | X | X | | Poor Firmness |
| 146 | Low | High | X | X | X | | Poor Firmness |
| 147 | Low | High | X | X | X | | Poor Firmness |
| 19 | Low | Low | X | | | | Poor Firmness |
| 93 | Low | High | X | X | X | | Ideal Melt and Firmness |
| 98 | Low | High | X | X | X | | Ideal Melt and Firmness |
| 143 | Low | High | X | X | X | | Ideal Melt and Firmness |
| 150 | Low | High | X | X | X | | Ideal Melt and Firmness |
| 115 | High | High | X | X | X | | Ideal Melt and Firmness |
| 123 | High | High | X | | | X | Ideal Melt and Firmness |
| 91 | Low | Low | X | X | X | | Ideal Melt and Firmness |
| 95 | Low | Low | X | X | X | | Ideal Melt and Firmness |
| 108 | Low | Low | X | X | X | | Ideal Melt and Firmness |
| 109 | Low | Low | X | X | X | | Ideal Melt and Firmness |
| 111 | Low | Low | X | X | X | | Ideal Melt and Firmness |
| 112 | Low | Low | X | X | X | | Ideal Melt and Firmness |
| 99 | High | Low | X | X | X | | Ideal Melt and Firmness |
| 24 | High | Low | X | | | | Poor Firmness |
| 29 | High | Low | X | | | | Poor Firmness |
| 30 | High | Low | X | | | | Poor Firmness |
| 38 | High | Low | X | | | | Poor Firmness |
| 41 | High | Low | X | | | | Poor Firmness |
| 60 | High | High | X | | | X | Poor Melt |
| 64 | High | High | X | | | X | Poor Melt |
| 101 | High | High | X | X | X | | Poor Melt |
| 125 | High | High | X | | X | | Poor Melt |
| 131 | High | High | X | X | X | | Poor Melt |
| 20 | High | Low | X | | | | Poor Melt |
| 23 | High | Low | X | | | | Poor Melt |
| 86 | High | Low | X | | X | | Poor Melt |
| 100 | High | Low | X | X | X | | Poor Melt |
| 10 | High | Low | X | | | | Poor Melt and Firmness |
| 16 | High | Low | X | | | | Poor Melt and Firmness |
| 26 | High | Low | X | | | | Poor Melt and Firmness |
| 45 | High | Low | X | | | X | Poor Melt and Firmness |

Figure 10:
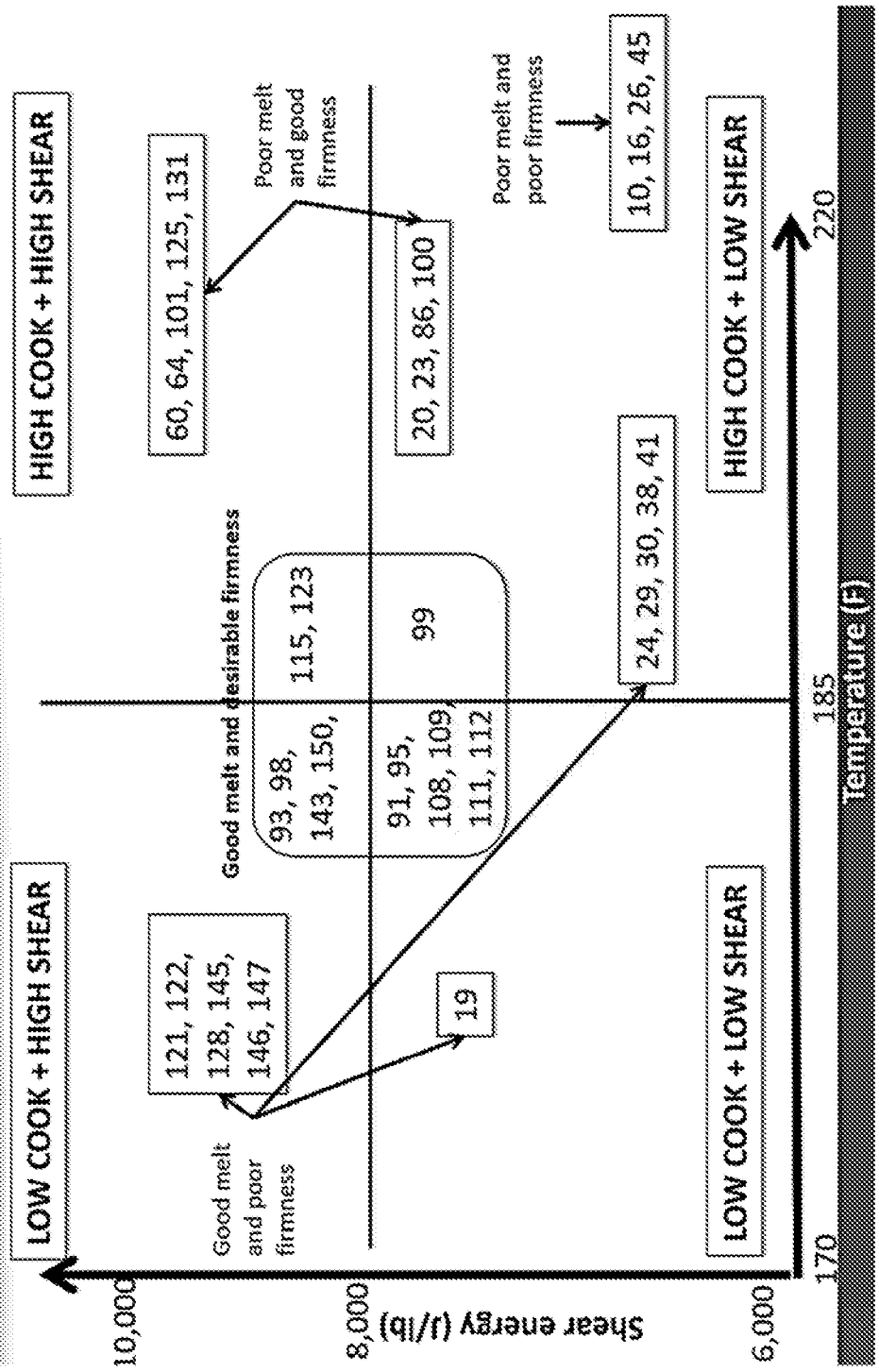
FIG. 10 is a plot showing the impact of shear energy and temperature conditions on variable exemplary compositions found in Table 9.

A plot of the general conditions for the samples shown in Table 9 is represented in FIG. 10. As seen in this figure, varying the shear and temperature for cooking impacted the overall melt and firmness of the compositions.

FIG. 11 shows rheological thermal analysis comparing desirable melt and firmness of a sample with desirable firmness (Sample #123 with melt data 1.25 and firmness 8.33 Kg·s; Formula Examples 1, 3, 4 and 7) vs. poor firmness (Sample #146 with melt data 1.30 and firmness 5.2 Kg·s; Formula Examples 5 and 6). No additional shear was applied in processing of Sample #146, leading to poor firmness compared to Sample #123.

Figure 12:
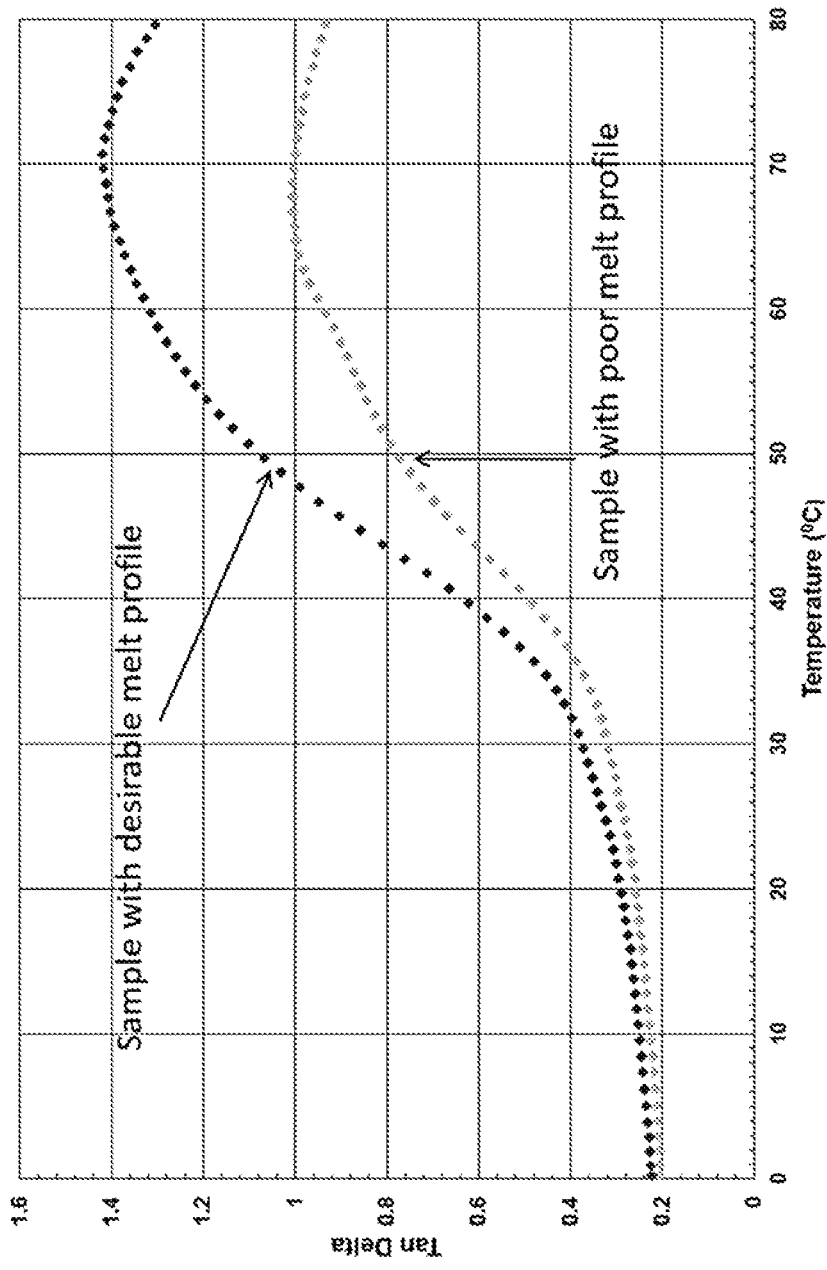
FIG. 12 is a plot of Tan Delta versus temperature for sample compositions.
Figure 13:
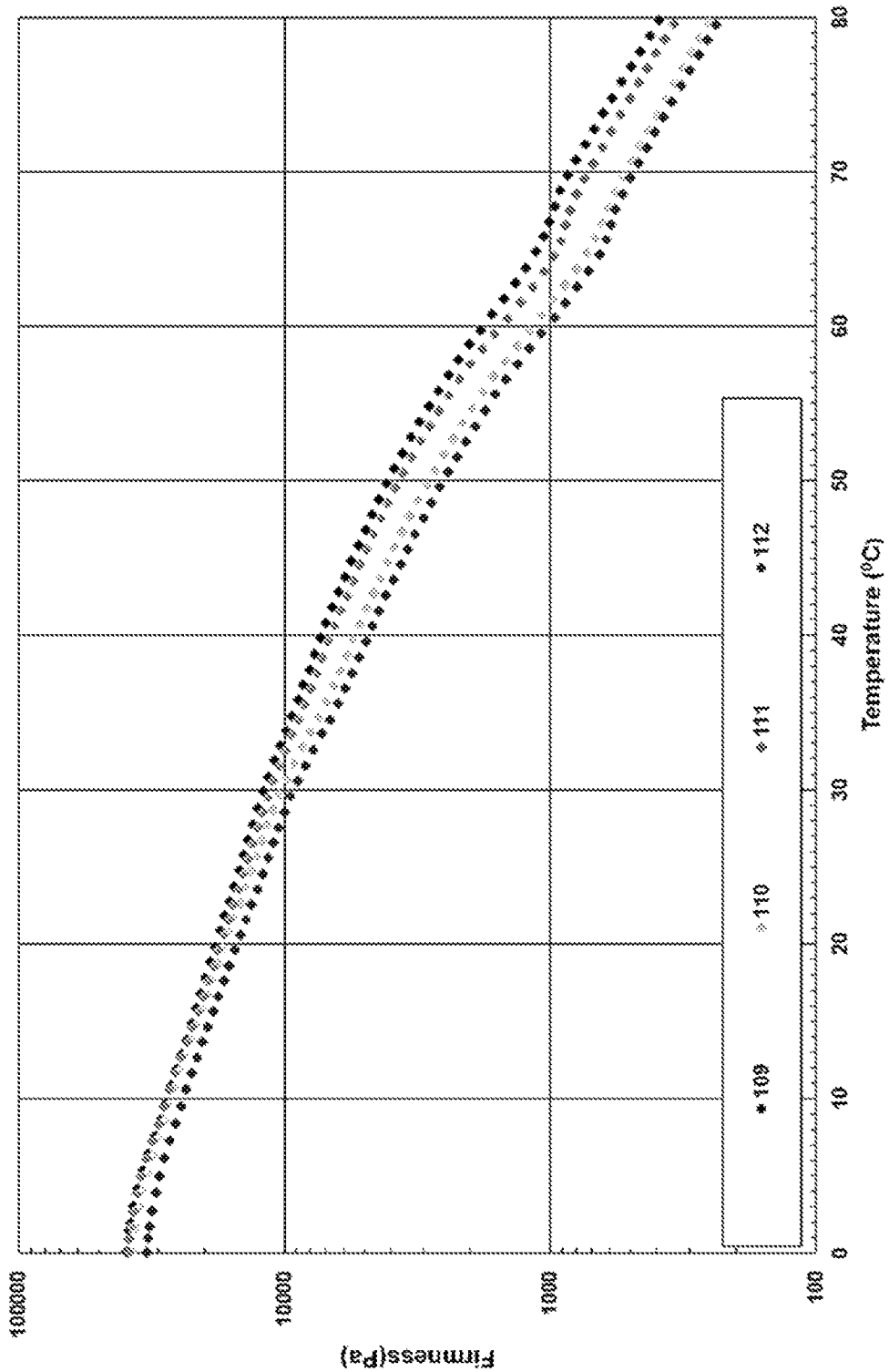
FIG. 13 shows rheological thermal analysis mapping firmness of samples that meet desired firmness in samples with 5% canola oil (Sample #109, 110, 111, 112 with good firmness)
Figure 14:
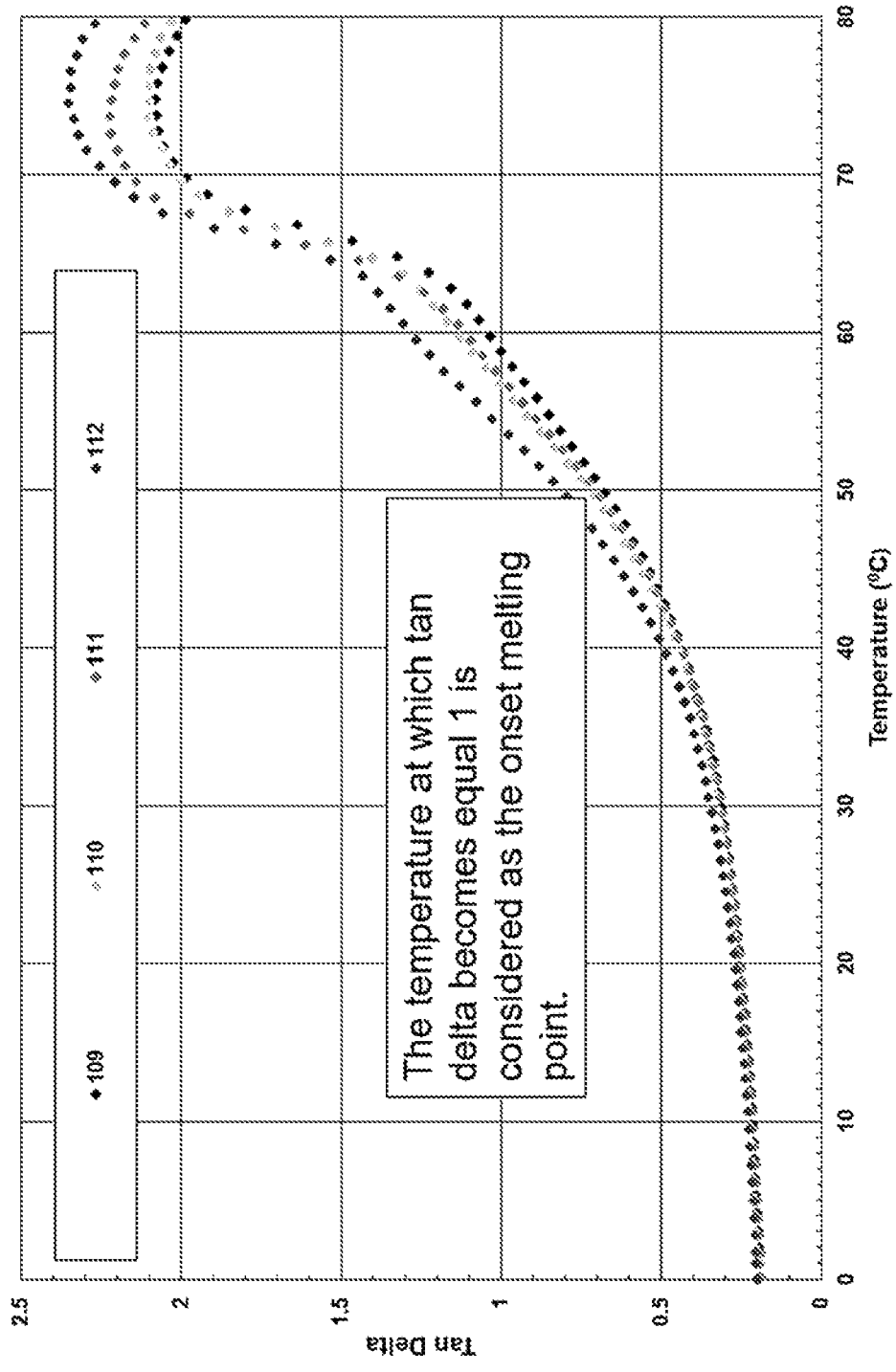
FIG. 14 shows rheological thermal analysis of Tan Delta versus temperature of samples that meet desired firmness in samples with 5% canola oil (Sample #109, 110, 111, 112 with good firmness)
Figure 15:
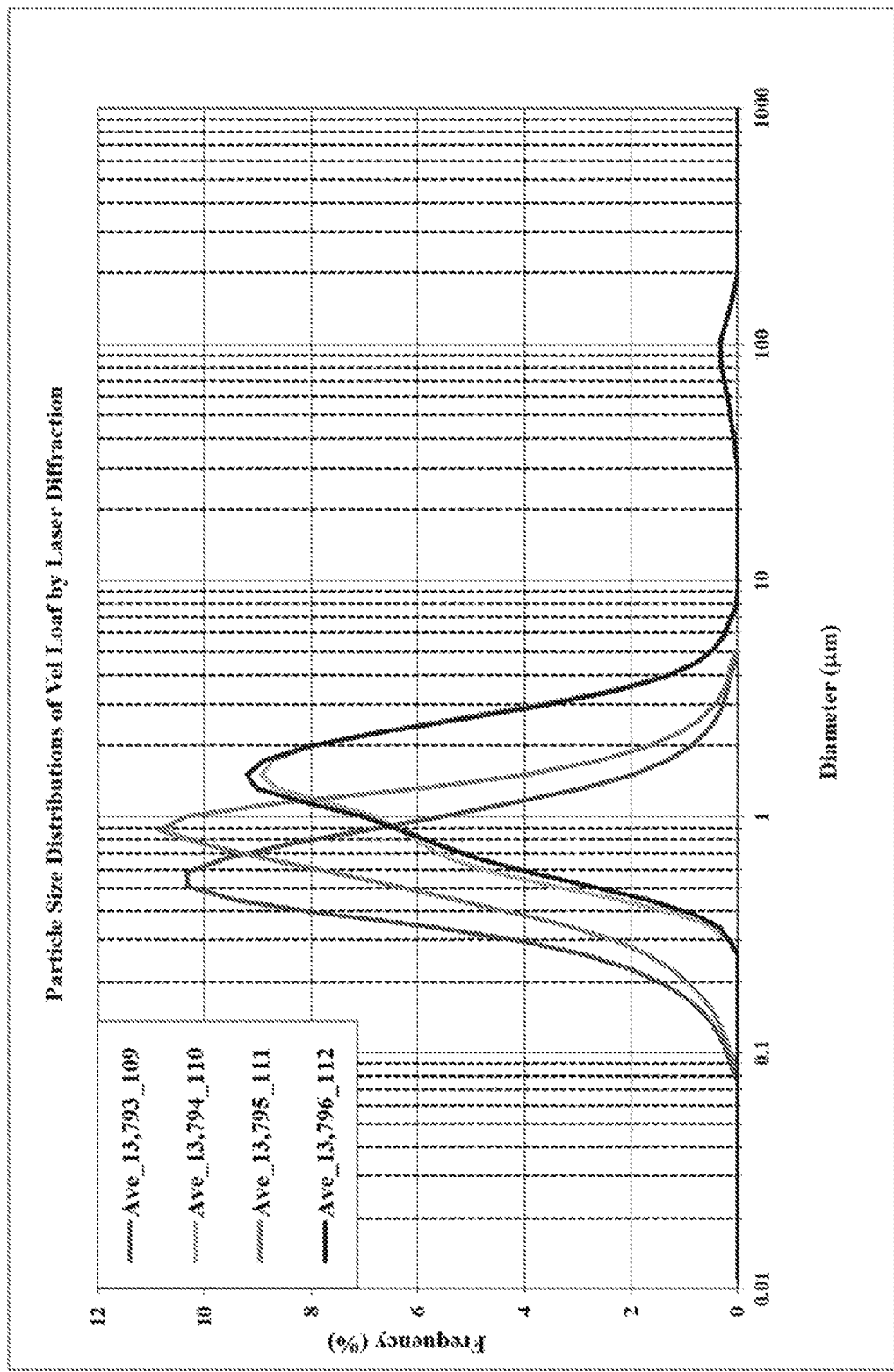
FIG. 15 shows fat droplet size for Samples 109, 110, 111, 112.

FIG. 12 shows rheological thermal analysis comparing a sample with desirable melt and firmness (Sample #123 with melt data 1.25 and firmness 8.33 Kg·s; Formula Examples 1, 3, 4, and 7) vs. poor firmness (Sample #101 with melt data 0.875 and firmness 13.8 Kg·s). Sample #101 was cooked at high temperature and high shear compared to Sample #123, leading to poor melt.

Figure 16:
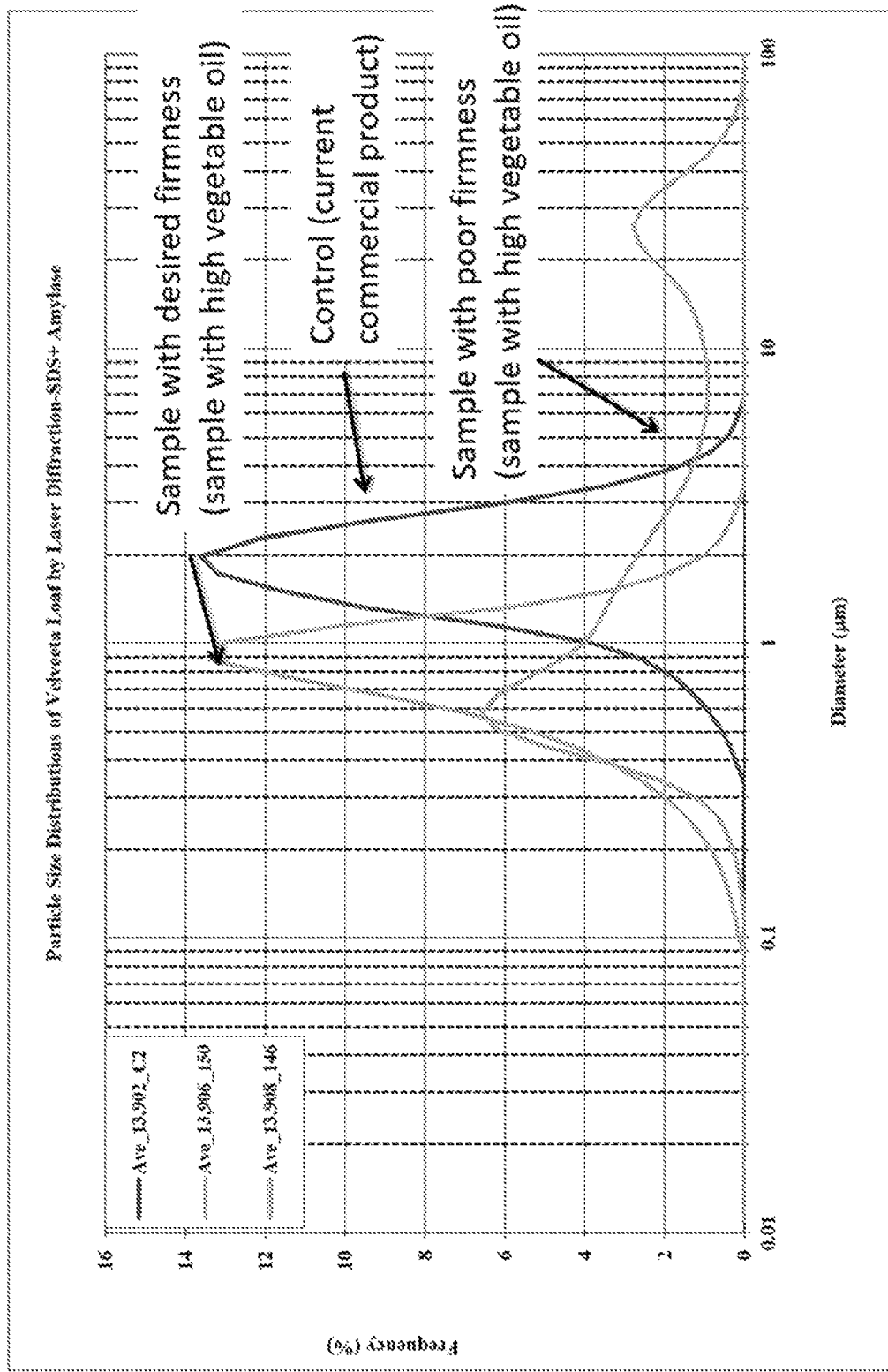
FIG. 16 shows oil droplet size for various samples.

FIG. 16 shows oil droplet size for various samples. For example, Sample #150 (Formula Example 1) with oil droplet size smaller than 10 micron with desired firmness (8.8 Kg·s) vs. Sample #146 (Formula Example 5) without shear has greater than 40% oil in particle size greater than 10 micron and undesirable firmness (5.2 Kg·s).

Table 10 includes various samples prepared based on the formulation of Example 2, described above. Each sample was varied based on the starches used in each, as shown in Table 10.

TABLE 10

Successes and Failures
Examples of Successes and Failures from Pilot Plant
Trials of Processed Cheese Loaf Made w/10% Canola Oil

| Sample | E1442 | E1450 | E1404 | E1422 | E1420 | E1412 | Success*/Failure | Reason for Failure |
|---|---|---|---|---|---|---|---|---|
| Sample 1 | X | X | X | | | | Success | |
| Sample 4 | X | | | X | X | | Success | |
| Sample 8 | X | X | | | X | | Success | |

TABLE 10-continued

Successes and Failures
Examples of Successes and Failures from Pilot Plant
Trials of Processed Cheese Loaf Made w/10% Canola Oil

| Sample | E1442 | E1450 | E1404 | E1422 | E1420 | E1412 | Success*/Failure | Reason for Failure |
|---|---|---|---|---|---|---|---|---|
| Control | X | | | | | | Failure | Soft texture, very wet and sticky |
| Sample 2 | | X | | | X | | Failure | Didn't melt |
| Sample 3 | | X | X | | | | Failure | Slightly Sticky |
| Sample 5 | X | X | X | | | | Failure | Moderate firm texture, cracks when sliced, sticky |
| Sample 7 | X | X | | | | | Failure | Wet appearance and sticky |
| Sample 9 | X | X | | | | X | Failure | Didn't melt |

*Success criteria - Firm Texture, not sticky, melt

The total amount of starch used was 3% and a ratio of E1442, E1404 and E1450 that ranges from 0.1.5-0.6:0.15-0.4:0.25-0.6 or ratio of E1442 and E1450 that ranges from 0.1.5-0.6:0.25-0.6 or ratio of E1442 and E1404 that ranges from 0.1.5-0.6:0.25-0.6.

Pictures of the resulting compositions are shown in FIGS. 5-9. Sample 1, as shown in FIGS. 5A and 5B, resulted in a firm texture, with minimal stickiness to foil, with excellent melt. Sample 4, as shown in FIGS. 6A and 6B, had a firm texture, minimal stickiness to foil, and excellent melt. Sample 8, as shown in FIGS. 7A and 7B, had a firm texture, minimal stickiness to foil, and the composition melted. The control, as shown in FIG. 8A, had a soft texture, was very wet and sticky, and melted. Sample 2, as shown in FIG. 8B, had a very firm texture, was not sticky, and did not melt. Sample 3, as shown in FIG. 8C, had a firm texture, was slightly sticky, and melted. Sample 5, as shown in FIG. 9A, had a moderately firm texture with cracks when sliced, was sticky, and melted. Sample 7, as shown in FIG. 9B, had a firm texture, was slightly wet and sticky, and melted. Sample 9, as shown in FIG. 9C, had a firm texture, was not sticky, and did not melt.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A process recipe cheese product composition comprising:
    about 1 to about 12 wt. % vegetable oil that is liquid at room temperature;
    about 8 to about 16 wt. % dairy protein;
    about 0.5 to about 10 wt. % corn-derived starch; and
    about 0 to about 10 wt. % potato-derived starch,
    wherein the composition is in the form of at least one of a slice, block, shred, loaf, or chunk and has a moisture content of 45% to 54%.

2. The process recipe cheese product composition of claim 1 wherein the corn-derived starch is cross-linked and acetylated.

3. The process recipe cheese product composition of claim 1 wherein the corn-derived starch comprises at least one of hydroxylated distarch phosphate and n-OSA substituted starch and the potato-derived starch comprises oxidized potato starch.

4. The process recipe cheese product composition of claim 1 wherein the corn-derived starch has a particle size of about 25 to about 40 microns.

5. The process recipe cheese product composition of claim 1 wherein the corn-derived starch is provided in a ratio of about 1:1 to about 6:1 relative to the potato-derived starch.

6. The process recipe cheese product composition of claim 1 wherein the process recipe cheese product contains oil droplets therein where at least 40% of the oil droplets are smaller than 10 micrometers.

7. A process recipe cheese product composition comprising:
    about 1 to about 12 wt. % vegetable oil that is liquid at room temperature;
    corn-derived starches; and
    potato-derived starches,
    wherein the process recipe cheese product has a moisture content of 45% to 54%, and provides a melt in a range of 1" to 1½" as measured by heating a disc of cheese 0.875" in diameter and 0.25" thick in a double boiler containing boiling water for 4 minutes.

8. The process recipe cheese product composition of claim 7 wherein the corn-derived starch is cross-linked and acetylated.

9. The process recipe cheese product composition of claim 7 wherein the corn-derived starch comprises at least one of hydroxylated distarch phosphate and n-OSA substituted starch and the potato-derived starch comprises oxidized potato starch.

10. The process recipe cheese product composition of claim 7 wherein the corn-derived starch has a particle size of about 25 to about 40 microns.

11. The process recipe cheese product composition of claim 7 wherein the corn-derived starch is provided in a ratio of about 1:1 to about 6:1 relative to the potato-derived starch.

12. The process recipe cheese product composition of claim 7 wherein the process recipe cheese product contains oil droplets therein where at least 40% of the oil droplets are smaller than 10 micrometers.

13. A method for preparing process recipe cheese product comprising the steps of:
    combining about 1 to about 12 wt. % vegetable oil that is liquid at room temperature, about 0.5 to about 10 wt. % corn-derived starch, about 8 to about 16 wt. % dairy protein, and about 0 to about 10 wt. % potato-derived starch to form a mixture;

cooking the mixture at a temperature of about 170° F. to about 210° F. to form a cooked mixture; and shearing at least one of the mixture and the cooked mixture, wherein the product has a moisture content of 45% to 54% and wherein at least one of the shearing and cooking steps are performed to provide oil droplets in the process recipe cheese product wherein at least 40% of the oil droplets are smaller than 10 micrometers.

14. The method of claim 13 wherein the process recipe cheese product provides a melt in a range of 1" to 1½" as measured by heating a disc of cheese 0.875" in diameter and 0.25" thick in a double boiler containing boiling water for 4 minutes.

15. The method of claim 13 wherein the corn-derived starch is cross-linked and acetylated.

16. The method of claim 13 wherein the corn-derived starch comprises at least one of hydroxylated distarch phosphate and n-OSA substituted starch and the potato-derived starch comprises oxidized potato starch.

17. The method of claim 13 wherein the corn-derived starch has a particle size of about 25 to about 40 microns.

18. The method of claim 13 wherein the corn-derived starch is provided in a ratio of about 1:1 to about 6:1 relative to the potato-derived starch.

* * * * *